United States Patent
Onishi et al.

[11] Patent Number: 5,845,329
[45] Date of Patent: Dec. 1, 1998

[54] PARALLEL COMPUTER

[75] Inventors: Kazumasa Onishi; Yasuhito Koumura; Kenshi Matsumoto, all of Saitama-ken; Yasuhiro Oue, Chiba-ken, all of Japan

[73] Assignee: Sanyo Electric Co., Ltd., Osaka, Japan

[21] Appl. No.: 762,302

[22] Filed: Dec. 9, 1996

Related U.S. Application Data

[63] Continuation of Ser. No. 189,238, Jan. 31, 1994, abandoned.

[30] Foreign Application Priority Data

| Jan. 29, 1993 | [JP] | Japan | 5-013333 |
| Jul. 26, 1993 | [JP] | Japan | 5-183803 |
| Jul. 30, 1993 | [JP] | Japan | 5-189509 |
| Aug. 26, 1993 | [JP] | Japan | 5-211161 |

[51] Int. Cl.⁶ .................................................. G06F 12/04
[52] U.S. Cl. ................................. 711/157; 707/205
[58] Field of Search ........................... 395/600, 800, 395/425; 707/200, 205; 711/5, 127, 157

[56] References Cited

U.S. PATENT DOCUMENTS

| 4,195,342 | 3/1980 | Joyce et al. | 395/445 |
| 4,633,431 | 12/1986 | Bar | 395/280 |
| 4,754,394 | 6/1988 | Brantley, Jr. et al. | 395/405 |
| 4,783,736 | 11/1988 | Ziegler et al. | 364/200 |
| 4,965,718 | 10/1990 | George et al. | 364/200 |
| 4,980,822 | 12/1990 | Brantley, Jr. et al. | 395/412 |
| 5,111,389 | 5/1992 | McAuliffe et al. | 395/800 |
| 5,133,059 | 7/1992 | Ziegler et al. | 395/425 |
| 5,166,939 | 11/1992 | Jaffe et al. | 371/40.1 |
| 5,193,175 | 3/1993 | Cutts, Jr. et al. | 395/182.09 |
| 5,249,301 | 9/1993 | Keryvel et al. | 395/800 |
| 5,293,480 | 3/1994 | Miller et al. | 395/163 |
| 5,301,292 | 4/1994 | Hilton et al. | 395/425 |
| 5,301,297 | 4/1994 | Menon et al. | 395/425 |
| 5,341,489 | 8/1994 | Heiberger et al. | 395/425 |
| 5,379,440 | 1/1995 | Kelly et al. | 395/800 |
| 5,386,532 | 1/1995 | Sodos | 395/425 |
| 5,388,237 | 2/1995 | Sodos | 395/425 |
| 5,392,443 | 2/1995 | Sakakibara et al. | 395/800 |
| 5,412,788 | 5/1995 | Collins et al. | 395/425 |
| 5,418,916 | 5/1995 | Hall et al. | 395/375 |
| 5,428,803 | 6/1995 | Chen et al. | 395/800 |
| 5,463,755 | 10/1995 | Dumarot et al. | 395/475 |

*Primary Examiner*—Maria N. Von Buhr
*Attorney, Agent, or Firm*—Darby & Darby

[57] ABSTRACT

A parallel computer includes a plurality of processors arranged in a taurus mesh network, with each processor having a local memory, and a plurality of secondary storage units. The network is coupled to a host computer via a host interface. Interleave system information corresponding to the size of portions of a file to be divided and stored in the plurality of secondary storage units is also stored in the local memory of a processor. When the processor accesses the file, the interleave system information of the file in the processor local memory is referenced by the processor and the processor outputs a file transfer request in accordance with the interleave system information. In addition, when a file which is stored in accordance with given interleave system size information is to be accessed by another interleave system having different size information, it is recognized by a host interface that the access is by a different interleave system and the file can be stored again according to the different interleave system.

11 Claims, 14 Drawing Sheets

F I G. 6
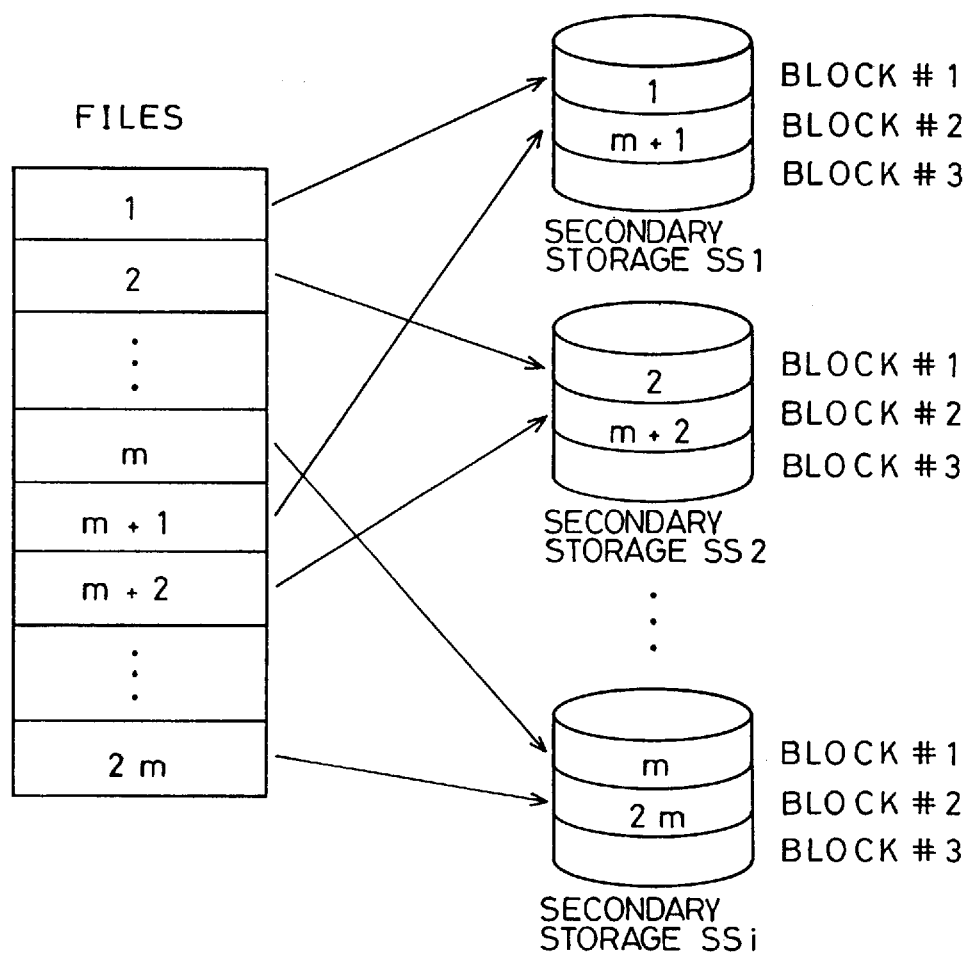

F I G. 7
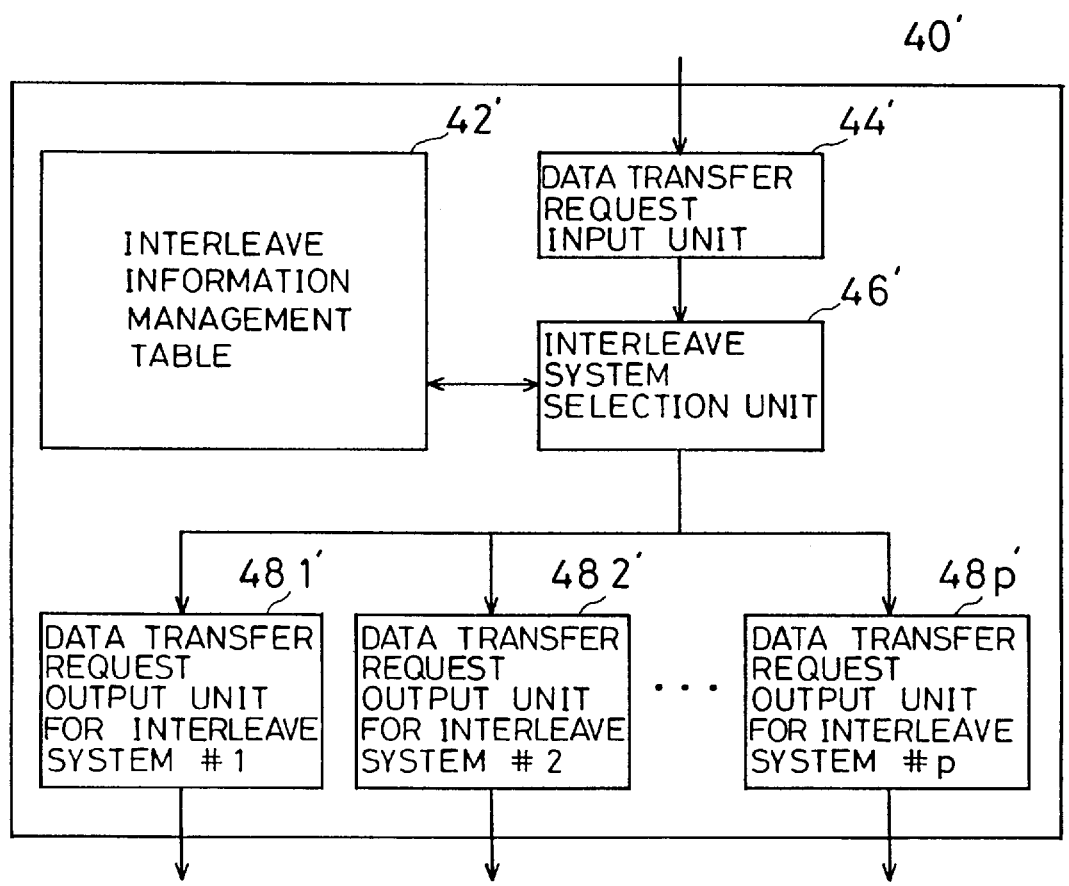

F I G. 10
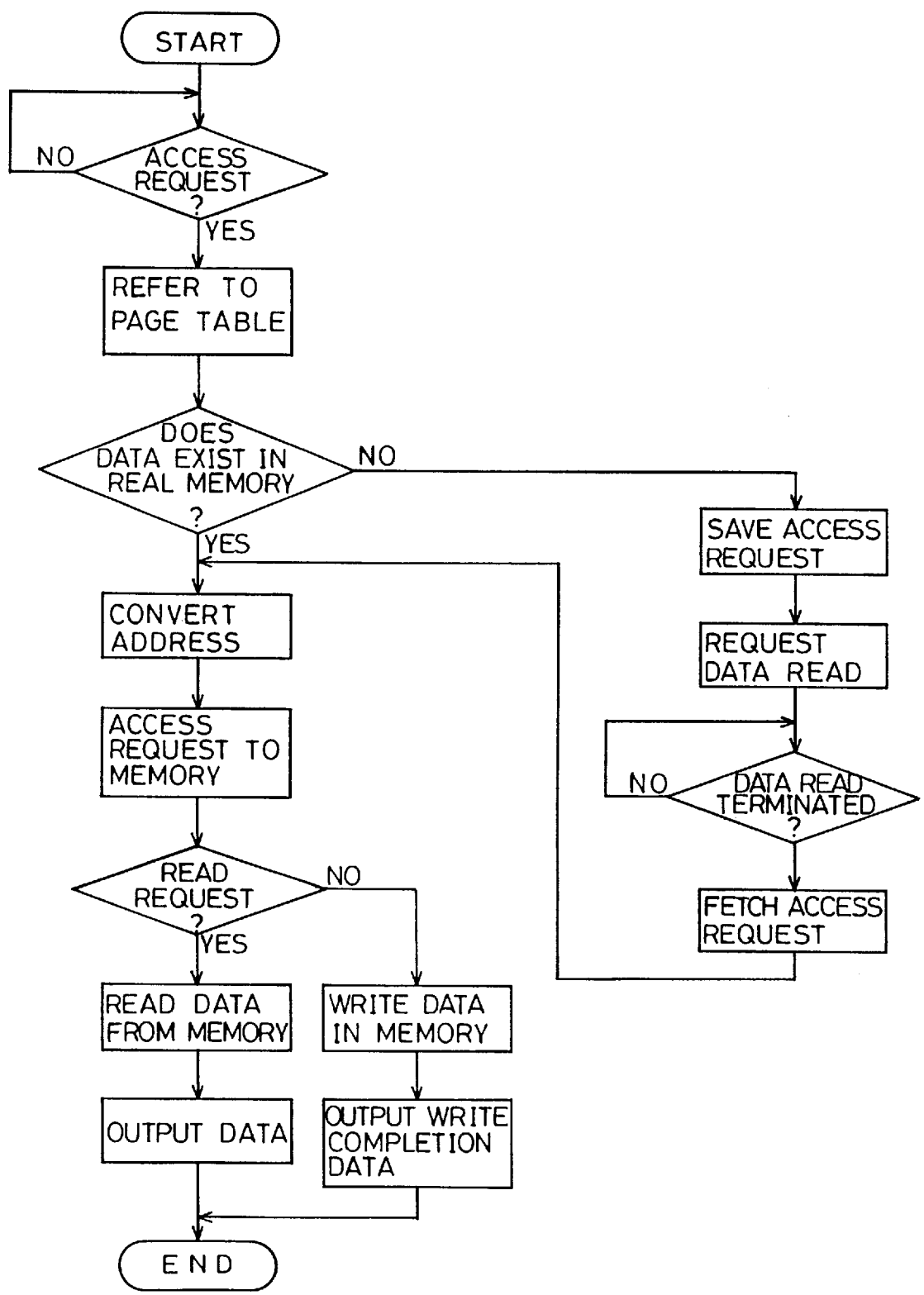

F I G.12
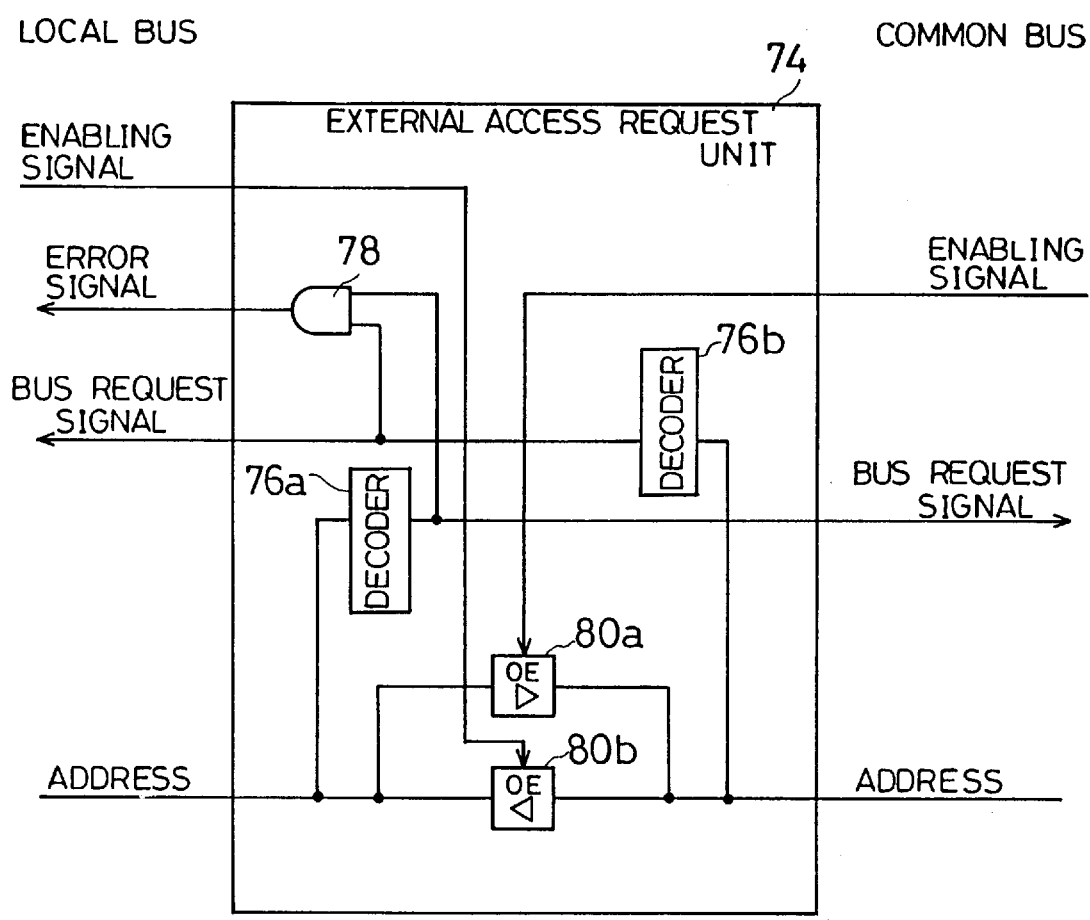

F I G. 13B
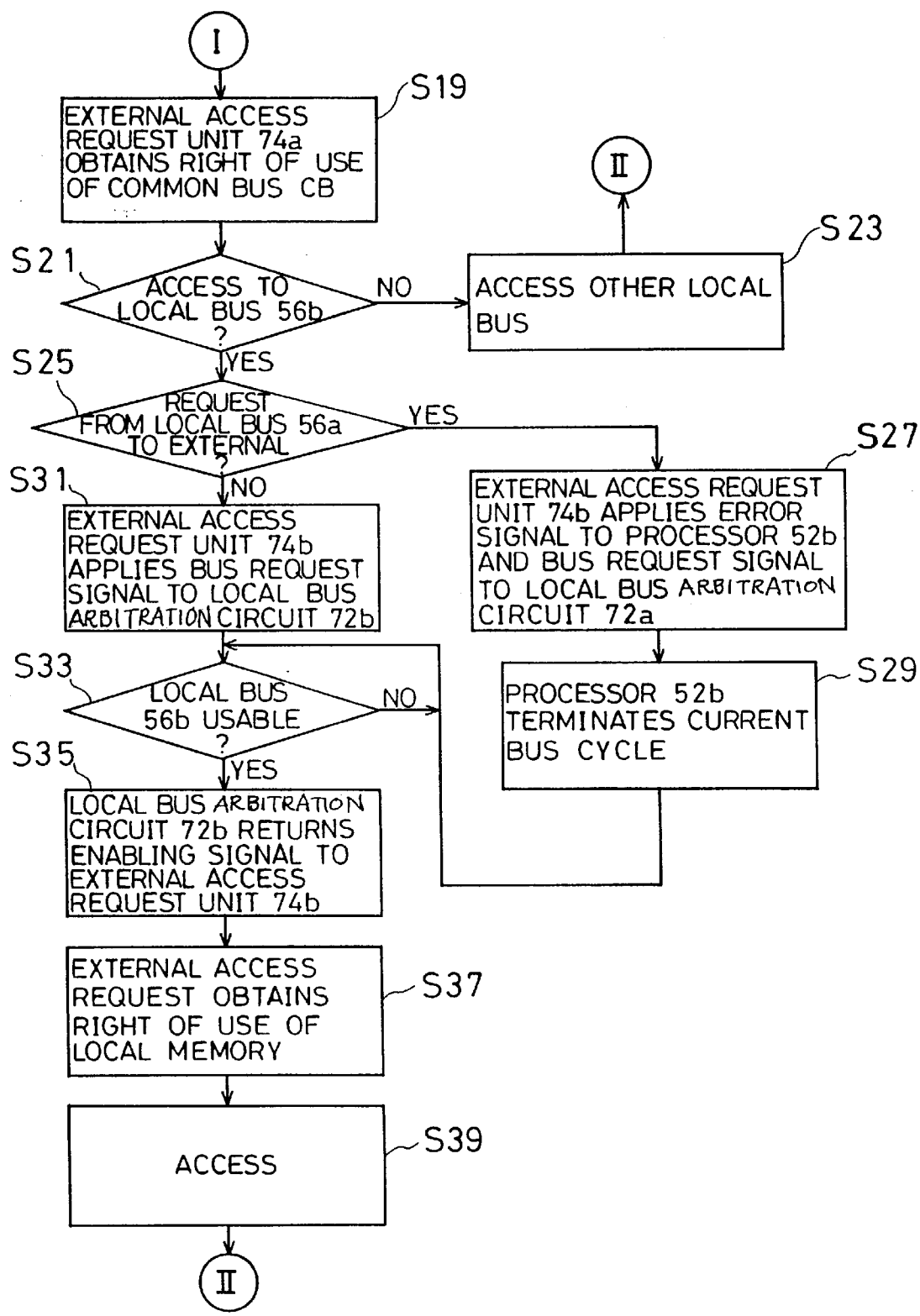

PARALLEL COMPUTER

This is a continuation, of application Serial No. 08/189.238, filed Jan. 31, 1994, now abandoned.

FIELD OF THE INVENTION

The present invention relates to a parallel computer. More specifically, the present invention relates to a parallel computer which includes a plurality of processors connected in a network and each having a local memory, and a plurality of secondary storages.

DESCRIPTION OF THE PRIOR ART

In a parallel computer using a plurality of processors coupled to each other in a network, in order to make possible rapid access to a large amount of data necessary for computing, a system having a plurality of secondary storage units connected in parallel with each other has been proposed.

As relevant prior art, "Parallel Secondary Storage in Data-driven Computer CYBERFLOW" disclosed at 46th National Conference of Japan Information Processing Society is known, for example. In the prior art, by connecting a plurality of discs (secondary storage units) in an east–west direction of network links which connect a large number of processors to each other in a taurus mesh fashion, parallel data transfer paths between the processors and the discs are formed such that data transfer efficiency can be improved.

Furthermore, in such a parallel computer, it is proposed to use a system in which the data is divided and stored in a plurality of secondary storage units that can be accessed in parallel, in order to decrease processing time.

As another relevant prior art, "Control System for Disc Access Conflict in Data Base Processor RINDA" disclosed in The Proceedings, vol. 33 No. 9 of Japan Information Processing Society is known, for example. In this prior art, the table data which is an object to be searched is divided into a plurality of disc blocks and stored, and by performing parallel searching, the search time can be shortened.

However, in the above described prior art systems, an interleave system of a file is fixed, and therefore, it is impossible to change an interleave system in correspondence with a program to be executed.

On the other hand, in a general purpose parallel computer in which various kinds of programs can be executed, since methods for accessing the data to be computed are different from each other according to the programs, in order to perform access to the data efficiently, a plurality of interleave systems according to the programs becomes required.

In a parallel image processing system, for example, where a plurality of processors perform different processings with respect to different portions of the image data stored in secondary storage, an interleave system shown in FIG. 1 is effective. In the FIG. 1 system, a file is divided into a plurality of unit files capable of being accessed at a time by the processors, and the unit files are assigned in sequence to a plurality of secondary storage units. Since the plurality of secondary storage units can be operated in parallel with each other in accessing to continuous regions of portions of the file by the processors, the FIG. 1 system is efficient.

Furthermore, in a case where a row including a given character train is to be selected from a file in a parallel data base system, for example, an interleave system shown in FIG. 2 is effective. In the FIG. 2 system, since the same processings for the file are performed by the processors, the file is equally divided into file portions according to the number of processors, and then, the file portions are assigned to respective secondary storage units.

In the conventional parallel computer systems, only one kind of such interleave system is supported, and therefore, the execution efficiency is lowered by performing the interleave according to the program to be executed.

Furthermore, in a case where the data stored according to a given program is utilized again by another program, there occurs a case that an interleave system different from an interleave system which is utilized for storing the data becomes more efficient. In such a case, when the latter program is executed, it is required that the data is stored again according to a desired interleave system. In addition, in any of the systems shown in FIG. 1 and FIG. 2, the object to be interleaved is only a file, and therefore, in a case where the data other than file, e.g. a status of the program being executed is to be saved, it is impossible to store the data without its being interleaved.

In a general purpose computer, a program is executed by the processor accessing the program and the data stored in the local memory. Since a usable amount of the local memory is dynamically changed according to a status of execution of the program, when the data or the program exceeds the usable amount of the local memory, it is necessary to temporarily save portions of the program or the data in secondary storage.

Furthermore, in a system where a plurality of programs are executed apparently simultaneously by executing a plurality of programs switched at predetermined time intervals, in switching the program, information such as a program, data and status of a processor are conserved or saved. However, since the capacity of the local memory is limited, the information of the program which is switched is saved in the secondary storage until the same is to be executed again.

However, access speed to the data stored in the secondary storage is very slow in comparison with access speed to the data of the local memory, and therefore, the data transfer between the local memory and the secondary storage lowers efficiency of the system.

OBJECTS OF THE INVENTION

Therefore, a principal object of the present invention is to provide a novel parallel computer.

Another object is to provide a parallel computer in which it is possible to make the program execution rapid by storing files in secondary storage units by utilizing an interleave system which is optimum for each program.

Another object is to provide a parallel computer in which by saving data of the local memory into a plurality of secondary storage units that is interleaved, the parallel data transfer between the local memory and the secondary storage can be made possible to be executed, whereby efficiency of the system can be increased.

Another object of the present invention is to provide a parallel computer capable of efficiently processing an access request even when a page fault occurs.

Another object of the present invention is to provide a parallel computer capable of efficiently processing a conflict of bus requests.

BRIEF DESCRIPTION OF THE INVENTION

A parallel computer according to the present invention comprises a plurality of processors and a plurality of secondary storage units each capable of being accessed by respective processors. The parallel computer has an interleave function by which a file is dividedly stored in the plurality of secondary storage units. The parallel computer further comprises interleave information management means for managing or controlling interleave system information of a file which is dividedly stored in the plurality of secondary storage units, and file access means capable of selecting an interleave system.

In another aspect of the present invention, a parallel computer comprises a plurality of processors each having a local memory, and a plurality of secondary storage units each capable of being accessed by respective processors, and has an interleave function data which is saved from the local memory is dividedly stored in the plurality of secondary storage units. The parallel computer further comprises interleave information management means for managing or controlling interleave system information of the data which is dividedly stored in the plurality of secondary storage units, and data access means capable of selecting an interleave system.

In the former parallel computer, the interleave system information of the file which is stored in the plurality of secondary storage units upon being divided is stored in the interleave information management means, and at a time that the file is to be accessed, the interleave system information of the file stored in the interleave information management means is referenced, and file transfer request outputting means according to the interleave system is utilized, and therefore, an access to the file can be performed with the optimum interleave system.

In addition, in a case where the file stored by a given interleave system is to be accessed with another interleave system, it is recognized by the interleave information management means that the data is to be accessed by a different interleave system, whereby the file can be re-stored by the different interleave system.

In the latter parallel computer, in a case where there occurs the necessity for conserving or saving the data of the local memory into the secondary storage, the processor selects a desired interleave system, and outputs a data transfer request according to the desired interleave system from a data transfer request output unit. Then the data is transferred to the plurality of secondary storage units, the interleave system information of the data stored in the plurality of secondary storages being divided to be stored in the interleave information management means. Then, in a case where the data conserved or saved in respective secondary storages after being divided is to be restored in the local memory, the interleave system information of the data from the interleave information management means is referenced, and a data transfer request output unit according to the interleave system is utilized, and therefore, an access to the data can be performed by the optimum interleave system.

In accordance with the present invention, in a parallel computer having a plurality of processors, and a plurality of secondary storages each capable of being accessed by respective processors, it is possible to store a file in the secondary storages by utilizing an interleave system which is optimum for each program, and therefore the program execution can be made rapid.

Furthermore, in accordance with the present invention in the parallel computer comprising a plurality of processors each having a local memory, and a plurality of secondary storages each capable of being accessed by respective processors, by saving the data of the local memory in the plurality of secondary storages upon being interleaved, the data transfer between the local memory and the secondary storages can be performed in parallel, and accordingly, the efficiency of the whole system can be increased.

In another embodiment according to the present invention, a secondary storage control unit such as a disc interface controls writing or reading the data in or from the secondary storage. The disc interface includes a processor and a memory coupled to each other by a local bus. The disc interface has a request saving unit, and saves an access request to the request saving unit when the access request is for an access to the data which does not exist in the memory, and processes an access request which follows the access request More specifically, an access request is inputted to the memory included in the disc interface from the processor of the disc interface and it is determined whether or not a page fault occurs in the data to be accessed by the access request by referring to a page table, for example. Then, if no page fault occurs, the memory can be immediately accessed, so that the writing or reading of the data is performed. On the other hand, when a page fault occurs, the secondary storage is requested to read the data, and an accessed request is saved in the request saving unit during a time until the data is read. Then another first access request which succeeds to the access request and for accessing the data that no page fault occurs is processed prior to the access request being saved. Therefore, in accordance with this first embodiment, when the page fault occurs in the preceding access request, the succeeding access request is processed prior to the preceding access request, and accordingly, it is possible to efficiently process the access request.

In another aspect of the present invention, each disc interface includes a local bus, and external access request means are connected to the local bus. The local bus of the disc interface is commonly connected to a common bus via the external access request means. The external access request means gives a priority to a first acquisition request when the first acquisition from the common bus to the local bus and a second acquisition request from the local bus to the common bus conflict with each other.

In this embodiment, in a case where an acquisition request from the common bus to its own local bus and an acquisition request from its own local bus to the common bus conflict with each other in the external access request means of one disc interface, an error signal is inputted from the external access request means to its own processor. Accordingly, the processor which receives the error signal stops a bus cycle, and disclaims a right of use of its own local bus. Therefore, the local bus becomes to be used from the common bus, and therefore, another processor acquires the rights of use of all the buses. The processor which receives the error signal and disclaims once its own local bus confirms a course by which the error signal representing "the error due to the bus conflict" occurs by means of an interruption or the like, and thereafter, the processor may start executing the program again from the same address. Therefore, in accordance with the embodiment, no deadlock occurs even when the acquisition requests for the buses conflict with each other, and accordingly, the system is not stopped.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view showing one example of an operation of the embodiment shown in FIG. 3 -Figure 5;

FIG. 7 is a functional block diagram showing another example of the file access means provided in each processor of the FIG. 3 embodiment;

FIG. 10 is a flowchart showing an operation of the FIG. 9 embodiment;

FIG. 12 is a block diagram showing one example of an external access request unit included in the FIG. 9 embodiment; and FIG. 13A and FIG. 13B are flowcharts showing an operation of the embodiment shown in FIG. 11 and FIG. 12.

DETAILED DESCRIPTION OF THE PREFERRED EMBODIMENTS

Figure 1:
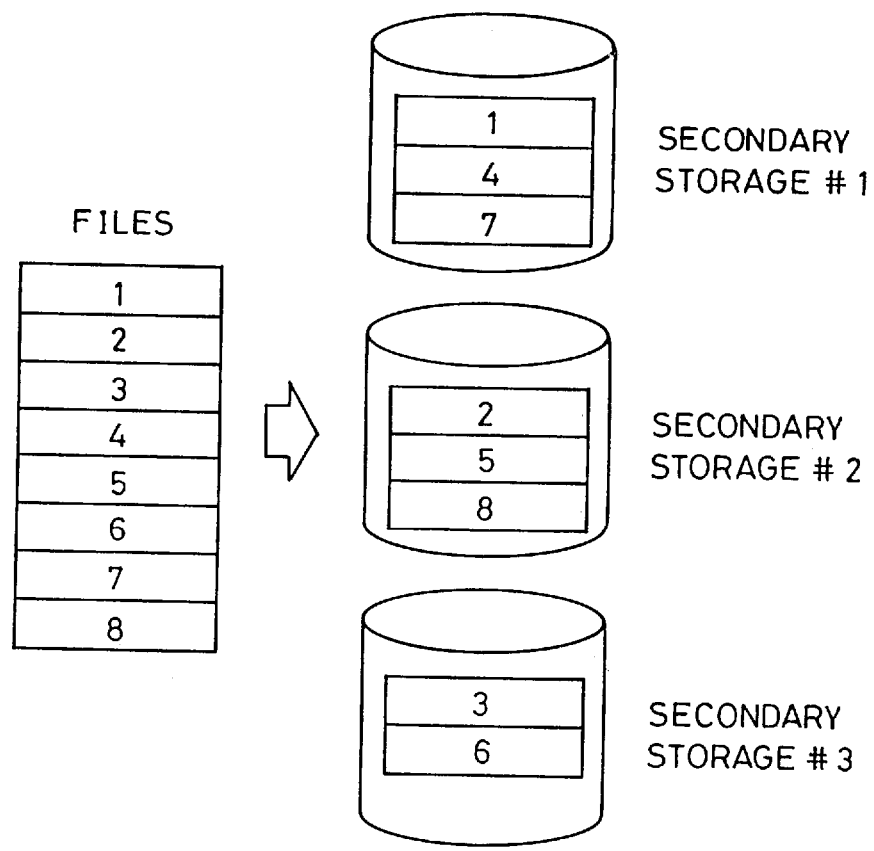
FIG. 1 is an illustrative view showing a first interleave system in which a file is divided into unit files each of which is capable of being accessed by a secondary storage at the same time, and the unit files are sequentially assigned to a plurality of secondary storages.
Figure 2:
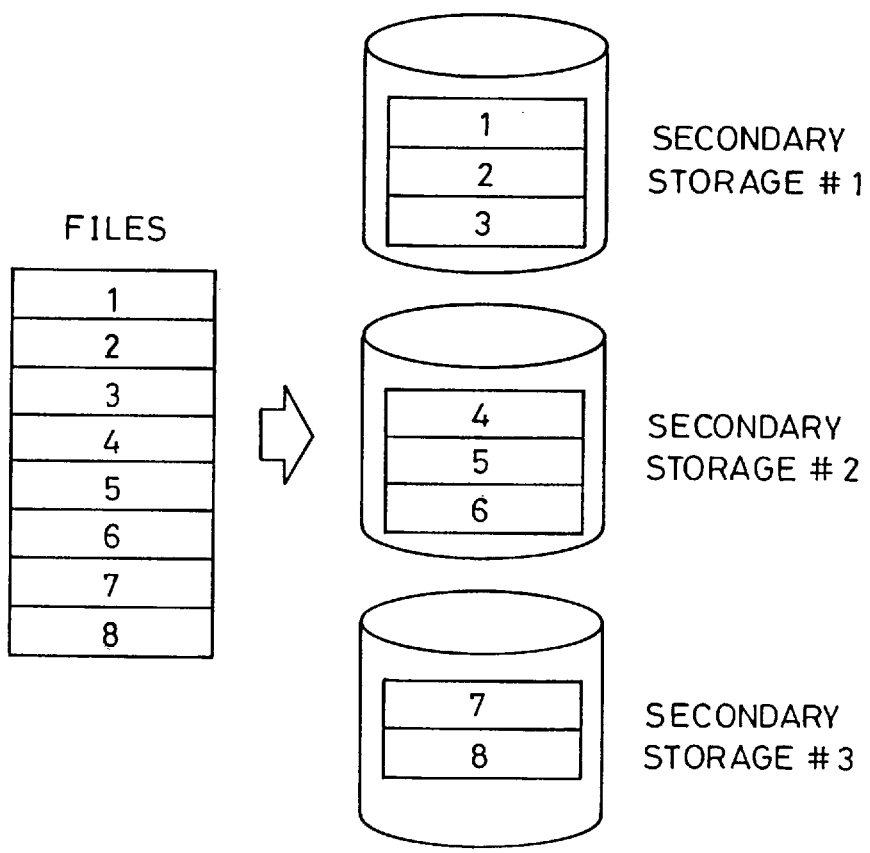
FIG. 2 is an illustrative view showing a second interleave system in which a file is equally divided into unit files in accordance with the number of processors, and respective unit files are assigned to respective secondary storages.
Figure 3:
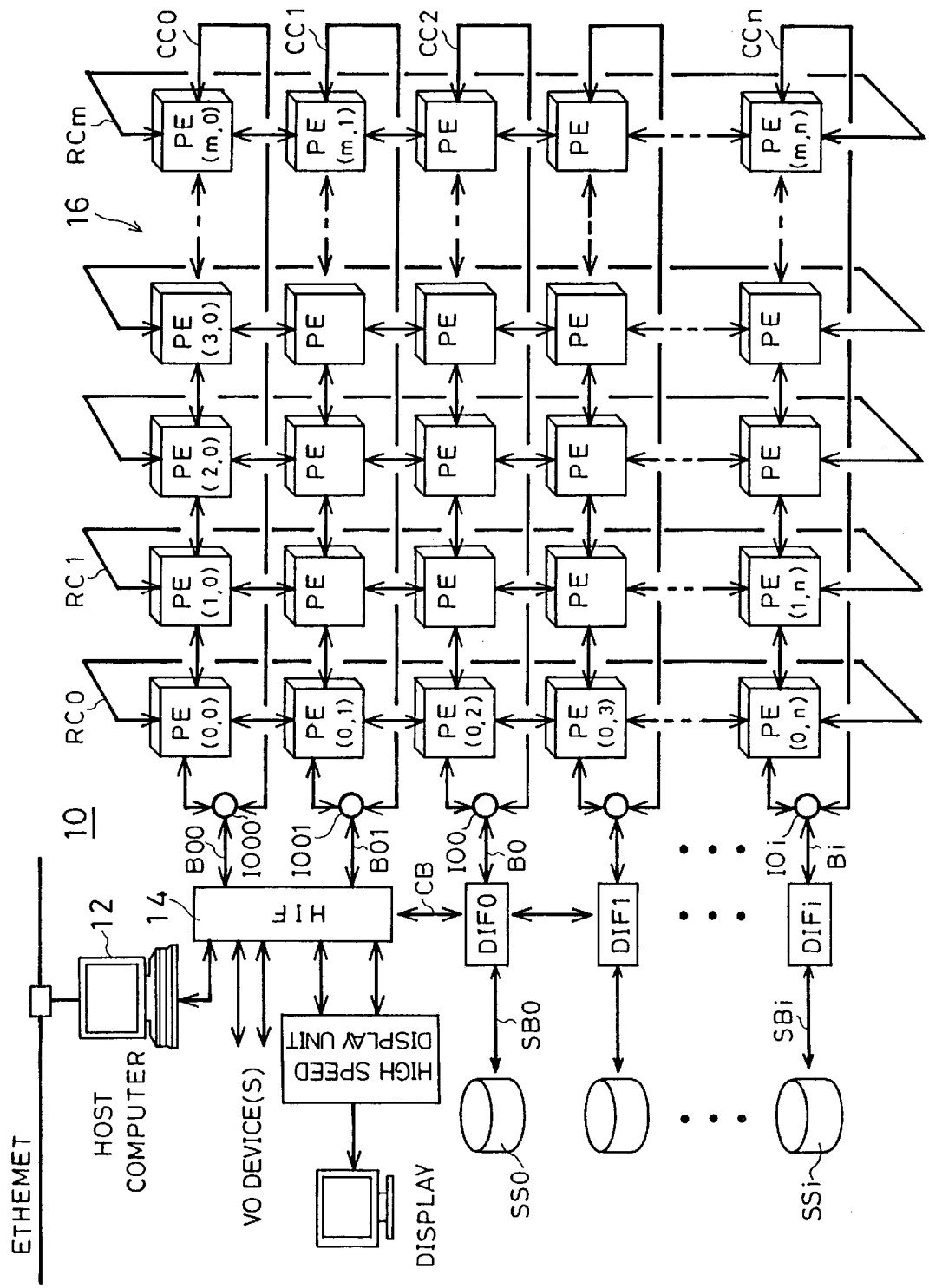
FIG. 3 is a block diagram showing a parallel computer to which the present invention is applied.

A parallel computer system 10 of the embodiment shown in FIG. 3 includes a host computer 12 which is coupled to a network 16 via a host interface (HIF) 14. The interface 14 is a bus interface or a cluster interface.

Figure 4:
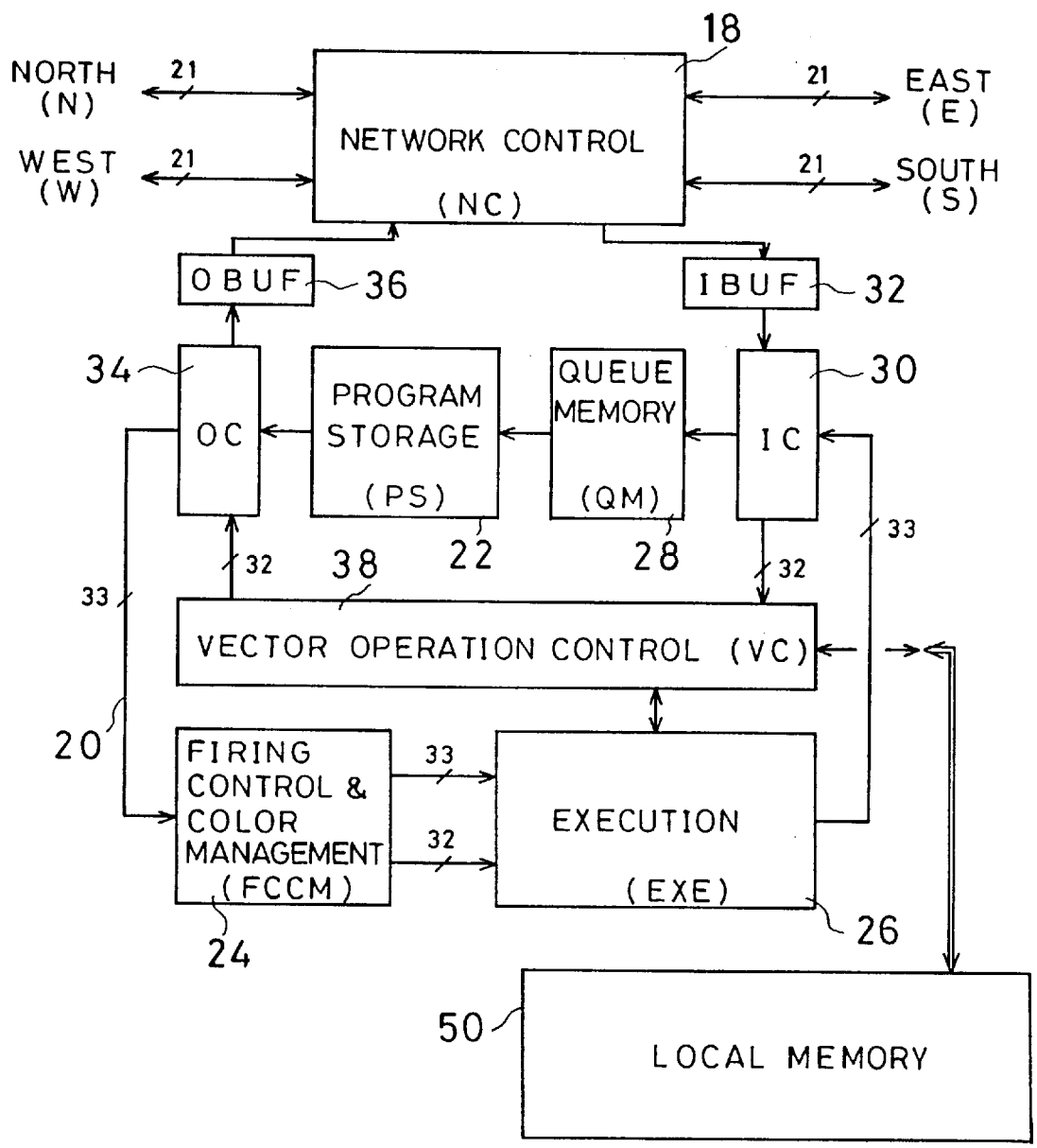
FIG. 4 is a block diagram specifically showing a processor of the FIG. 3 embodiment.

The network 16 includes a number of processor elements (hereinafter called "processor") PE0O-PEmn which are arranged in a mesh form. In detail, each of the processors PE0O-PEmn is constructed as shown in FIG. 4. On the network 16, the processors PE0O-PEmn are connected as a taurus mesh network. In addition, the taurus mesh network means the structure in which a plurality of processors are arranged in a matrix fashion and data transmission between arbitrary processors is made possible by utilizing row directional communication lines RC, which cyclically connect row directional processors and column directional communication lines CC, which cyclically connect column directional processors In the embodiment shown in FIG. 3, in a first row, n processors PE0O-PE0n are cyclically linked (in a circle) by a row directional communication line RC0, in a second row, n processors PE10-PE1n are cyclically linked by a row directional communication line RC1, and in an m-th row, n processors PEm0-PEmn are cyclically linked by a row directional communication line RCm. Furthermore, in a first column, m processors PE0O-PEm0 are cyclically linked by a column directional communication line CC0, in a second column, m processors PE01-PEm1 are cyclically linked by a column directional communication line CC1, and in an n-th row m processors PE0n-PEmn are cyclically linked by a column directional communication line CCn.

In the taurus mesh network 16, in order to communicate the data between the host computer 12 and respective processors PE0O-PEmn, an I/O node IO is inserted in each of the column directional communication lines CC0, CC1, ..., CCn as an inserter.

In this embodiment, the I/O nodes IO0O and I001 which are respectively inserted in two column directional communication lines CC0 and CC1 are connected to the host interface 14 by buses B0O and B01. Then, remaining column directional communication lines CC3-CCn are connected to buses B0-Bi via I/O nodes IO0IOi, and the buses B0-Bi are coupled to disc interfaces DIF0-DIFi.

The disc interfaces DIF0-DIFi are coupled to each other via a common bus CB that is also connected to the host interface 14. The disc interfaces DIF0-DIFi are respectively coupled to secondary storages SS0-SSi via buses SB0-SBi. In this embodiment as shown, each of the secondary storages SS0-SSi is constructed as a disc, and therefore, the disc interfaces DIF0-DIFi control the writing or reading the data to or from the secondary storages SS0-SSi.

Since the secondary storages SS0-SSi can be accessed not only by the processors PE0O-PEmn in the network 16 but also by the host computer 12, the supervision or management of the file stored in the secondary storages SS0-SSi is performed by the host interface 14. More specifically, the host interface-14 supervises the information of the file stored in the secondary storages SS0-SSi, and performs the file making, the file opening and etc. in accordance with a request from the processors PE0O-PEmn.

A processor PE shown in FIG. 4 is a one-chip LSI comprising a network control unit(NC) 18 and a pipeline ring (PR) 20. The processor PE further includes a program storage unit(PS) 22, a firing control and management unit (FCCM) 24, an execution unit(EXE) 26, and a queue memory(QM) 28. Data transfer is performed between the pipeline ring 20 and the network control unit 18 via an input control unit(IC) 30 and an input buffer 32, and an output control unit(OC) 34 and an output buffer 36.

The network control unit 18 has four bidirectional communication links and ports at north(N), east(E), south(S), and west(W), and these links effect the transfer of data between the pipeline ring 20 and the network control unit 18 and between the host computer 12 and other processor. In other words, the network control unit 18 takes a packet as input from any one of the four ports 18E, 18W, 18S and 18N and either sends it as an input to the input control unit 30 or sends a packet as an output to other ports. Likewise, the network control unit 18 takes a packet which is outputted from the pipeline ring 20, and outputs a packet to either one of the four ports 18E, 18W, 18S and 18N. In addition, the network control unit 18 has a self routing capability that outputs an input packet to a specific port so that a packet which is input from a certain port may arrive at the destination processing element over a minimum distance.

The input buffer 32 includes a buffer register which has a size equivalent to one packet so as to temporarily store the packet which is inputted from the network control unit 18, and the packet received by the input control unit 30 is then inputted to the pipeline ring 20. Although not shown in detail,, the input control unit 30 includes various registers. These registers are mainly used to store the processor number of the processor comprising the registers, the destination processor number to which a dumped packet is to be sent, and the status flag of the processing element. As necessary, the input control unit 30 sends packets to a vector operation unit(VC) 38.

The queue memory 28 is constructed as a FIFO memory of a size equivalent to 64 packets. The queue memory 28 absorbs the temporary increase of the number of packets in the pipeline ring 20, which occurs at a time that a packet is inputted or a time that the packet is to be copied, and the variation in the data flow due to variation of a time for various kinds of processings in the pipeline ring 20.

The program storage 22 includes a program memory whose primary purpose is storing data-flow graph which are made up of such information as connection information of a data-flow graph and instruction codes of each node, and performs such operations as updating control information e.g., the node number, data copying, and application of constants.

The output control unit 34 outputs a packet on the pipeline ring 20 or a packet from the vector operation control unit 38 to the output buffer 36 which has a capacity of one packet, capable of temporarily storing packets from the output control unit 34. As previously described, packets which are output from the output control unit 36 are outputted to one of the four ports 18E, 18W, 18S and 18N.

The firing control and color management unit 24 waits for arrival of left and right operands to execute instructions, waits for arrival of a number of data for synchronized operations, acquires a color for calling a subroutine, and gives back the color for returning from subroutines. A packet outputted from the firing control and color management unit 24 is transferred to the instruction execution unit 26 which executes various operations such as a 32-bit floating point arithmetic operation, a 32-bit integer arithmetic operation, a memory access, a vector operation, an input/output of a structure, decision of a condition, and branching.

In addition, each processor PE further includes a local memory 50 which is constructed by an SRAM of 512K byte, for example, and the vector operation control unit 38 controls vector operations such as operations among vectors stored in the local memory 50, vector and constant operations, vector data summation, and vector copy. The vector operation control unit 38 can also control ordinary memory access instructions.

In a case where any of the processors PE00-PEmn saves the data in any of the secondary storages SS0-SSi in the parallel computer 10, a desired interleave system is designated, and a request for file making is applied to the host interface 14. The host interface 14 which supervises the interleave information notifies a secondary storage unit 35 to which a head of the file is to be written and a position within the secondary storage to a processor which issues the request after the host interface 14 confirms that no file having the same name exists in any of the secondary storages SS0-SSi. In a case where a file having the same name has been saved in any secondary storage, the host interface 14 notifies the failure of the file making. The processor to which the success of the file making is notified can write the file into that secondary storage.

In contrast, in a case where the file exists in the secondary storage units SS0-SSi that is to be accessed, any of the processors PE00-PEmn issues a request for file opening to the host interface 14. The host interface 14 notifies the secondary storage in which the file is saved, the position of the secondary storage, and the file is saved by the interleave system, to the processor.

Figure 5:
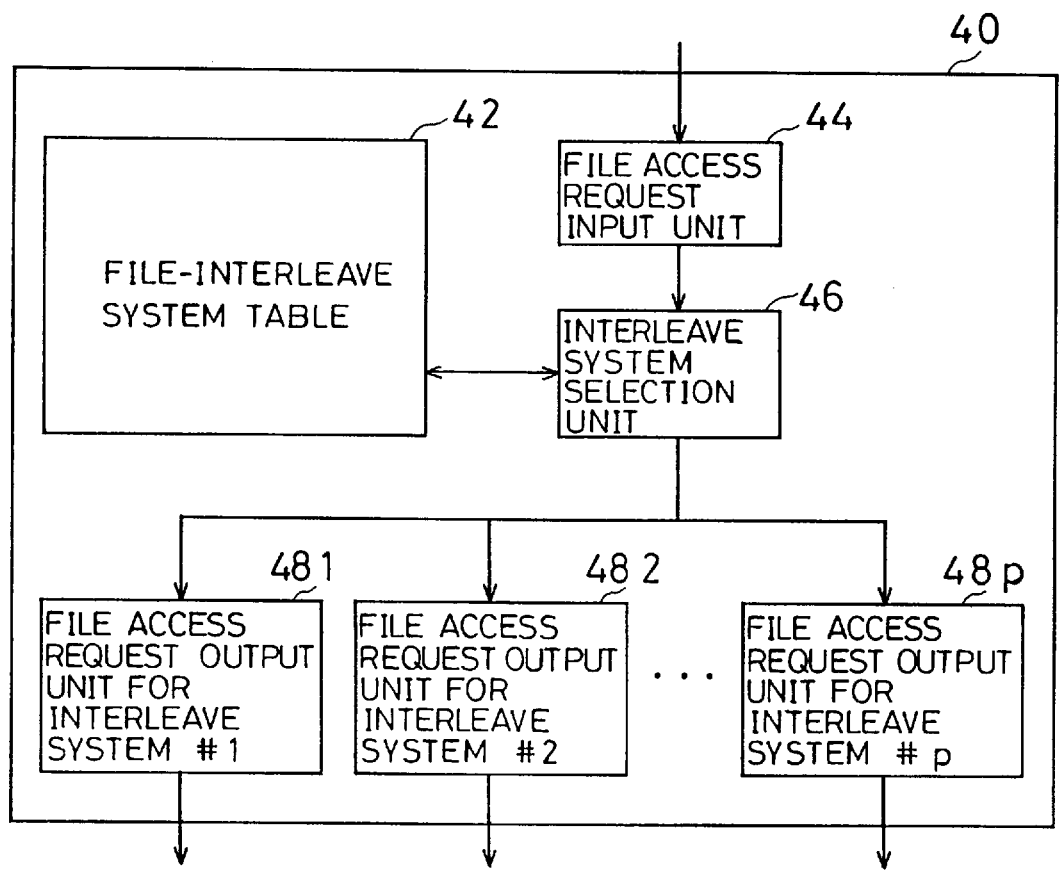
FIG. 5 is a functional block diagram showing one example of a file access means which is provided in each processor of the FIG. 3 embodiment.

Each of the processors PE00-PEmn includes a file access means 40 shown in FIG. 5. More specifically, a correspondence table between the information received from the host interface 14 and the file is stored in a file-interleave system correspondence table 42. A request for reading or writing the file is inputted to a file access request input unit 44, and the interleave system through which the file is saved is investigated with reference to the file-interleave system correspondence table 42 on the basis of the file name, and an access request is issued to any one of file access request output units 48 1, 48 2, . . . 48 p for the corresponding interleave system by an interleave system selection unit 46. The file access request output unit to which the access request is inputted issues an access request to a suitable secondary storage controller in accordance with that interleave system.

In a case where any of the processors PE00-PEmn is designated by the host interface 14 to write the head of the file in the block #1 of any of the secondary storages SS0-SSi, and the data is written according to the first interleave system shown in FIG. 3, the file access request output unit 481, for example, is utilized. An operation of this case will be described referring to FIG. 6.

First, the processor PE00, for example, issues a request that the head portion of the file is to be written into the block #1 of the secondary storage SS0 to the disc interface DIF0 for the secondary storage SS0 through the file access request output unit 48 1, for example. The processor PE00 issues a request that a succeeding portion of the file is to be written into the block #1 of the secondary storage SS1 to the disc interface DIF1 for the secondary storage SSI. The writing is sequentially performed, and when the writing into the block #1 of the last secondary storage SSi is completed, the writing into the secondary storage SS0 is performed again.

Thus, in the above described embodiment, any of the file access request output units 48 1-48 p according to the interleave system which is desired by the processor or designated by the host interface 14 is selected in the file access means 40, and therefore, it is possible to access the secondary storages SS0-SSi by utilizing a most suitable interleave system for each program.

In addition, as similar to a file access means 40' (FIG. 7), described later, the above described file access means 40 of FIG. 5 is a function performed by each processor PE. Each of the respective functional components of the file access means 40 (40') is provided in a form of a library if the same is to be loaded into the processor shown in FIG. 4. That is, the file access means 40 (40') is not a physical device, but a portion of the program stored in the program storage 22 shown in FIG. 4.

Next, an embodiment in which the data of the local memory 50 (FIG. 4) of the processor is written into the secondary storages SS0-SSi, or the data read from the secondary storages SS0-SSi is restored in the local memory 50 will be described.

In the parallel computer 10, if it becomes necessary to save the data in the local memory 50 into any of the secondary storages SS0-SSi, one of the processors PE00PEmn designates a desired interleave system and notifies the data saving to the host interface 14. The host interface 14 notifies a secondary storage unit SS into which the head of the data is to be written and a position of the secondary storage to the processor. On the other hand, the host interface 14 or the interleave information supervision table 42' (FIG. 7) records the position of the data to be transferred to the secondary storage and the information of the interleave system.

Then, each of the processors PE00-PEmn has the data access means 40' shown in FIG. 7, and the above described data saving request is inputted to the data transfer input request unit 44'included in the data access means 40', so that any of the data transfer request output units 48 1', 48 2', 48 p' for an interleave system which is corresponding to the designated interleave system is selected by the interleave system selection unit 46'. The data transfer request output unit for the interleave system which has been requested issues an access request to a suitable secondary storage control unit in accordance with that interleave system.

In contrast, when the data saved in the secondary storages SS0-SSi is restored in the local memory 50, the processor notifies the data restoration to the host interface 14. The host interface 14 notifies the secondary storage in which the data is saved, the position within the secondary storage, and the data is saved by the interleave system, to the processor. Furthermore, this information is recorded in the interleave information supervision table 42'. The data restoration request is inputted to the data transfer request input unit 44', and the interleave system selection unit 46' investigates the data that is saved in accordance with the interleave system by referring the interleave information supervision table 42', and selects any of the data transfer request output units 48 1'-48 i'. The selected data transfer request output unit issues the transfer request to a suitable secondary storage control unit according to the interleave system.

Figure 8:
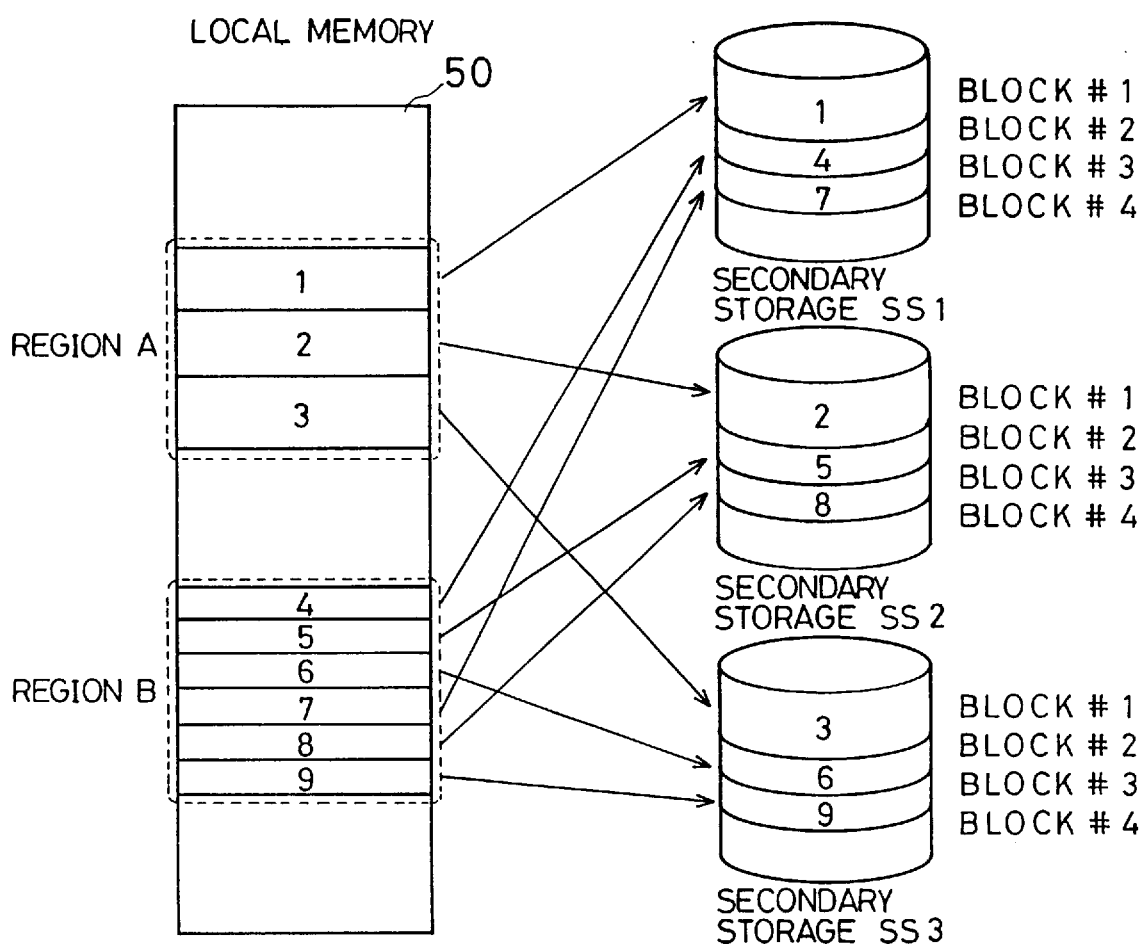
FIG. 8 is an illustrative view showing one example of an operation of the embodiment shown in FIG. 3 and FIG. 7.

An operation for transferring the data of the local memory 50 to three secondary storages will be described according to FIG. 8.

When the region A of the local memory 50 is divided into sizes each equal to 2 blocks of each of the secondary storages and transferred, the data is written in the block #1 and the block #2 of the respective secondary storages. Similarly, the region B is divided into sizes each equal to 1 block of each of the secondary storages to be transferred. The stored positions of the transferred data and the interleave system are recorded in the host interface 14 and the interleave information supervision table 42'.

In addition, in such a parallel computer, in a case where the local memory is used as a virtual memory, if the target data exists in the local memory (no page fault occurs), the access time to the data becomes equal to the access time to the local memory, and therefore, it is possible to process the data with a time less than 1 microsecond. However, if the target data does not exist in the local memory (page fault occurs), it becomes necessary to access to the secondary storages, and therefore, a time in the order of milliseconds is required for processing the data. Therefore, in a next embodiment, a scheme is made such that the processing efficiency of the succeeding access request does not deteriorate even if the page fault occurs in the proceeding access request.

In the following, the embodiment in which the above described scheme is applied to the disc interface DIF; however, it is pointed-out in advance that the following embodiment can be applied to the respective processors as it is in view of a fact that the disc interface DIF can be constructed as similar to the respective processors. In such a case, respective functional components shown in FIG. 9 can be implemented by the entirety of the processor PE including the vector operation control unit 38 (FIG. 3).

Figure 9:
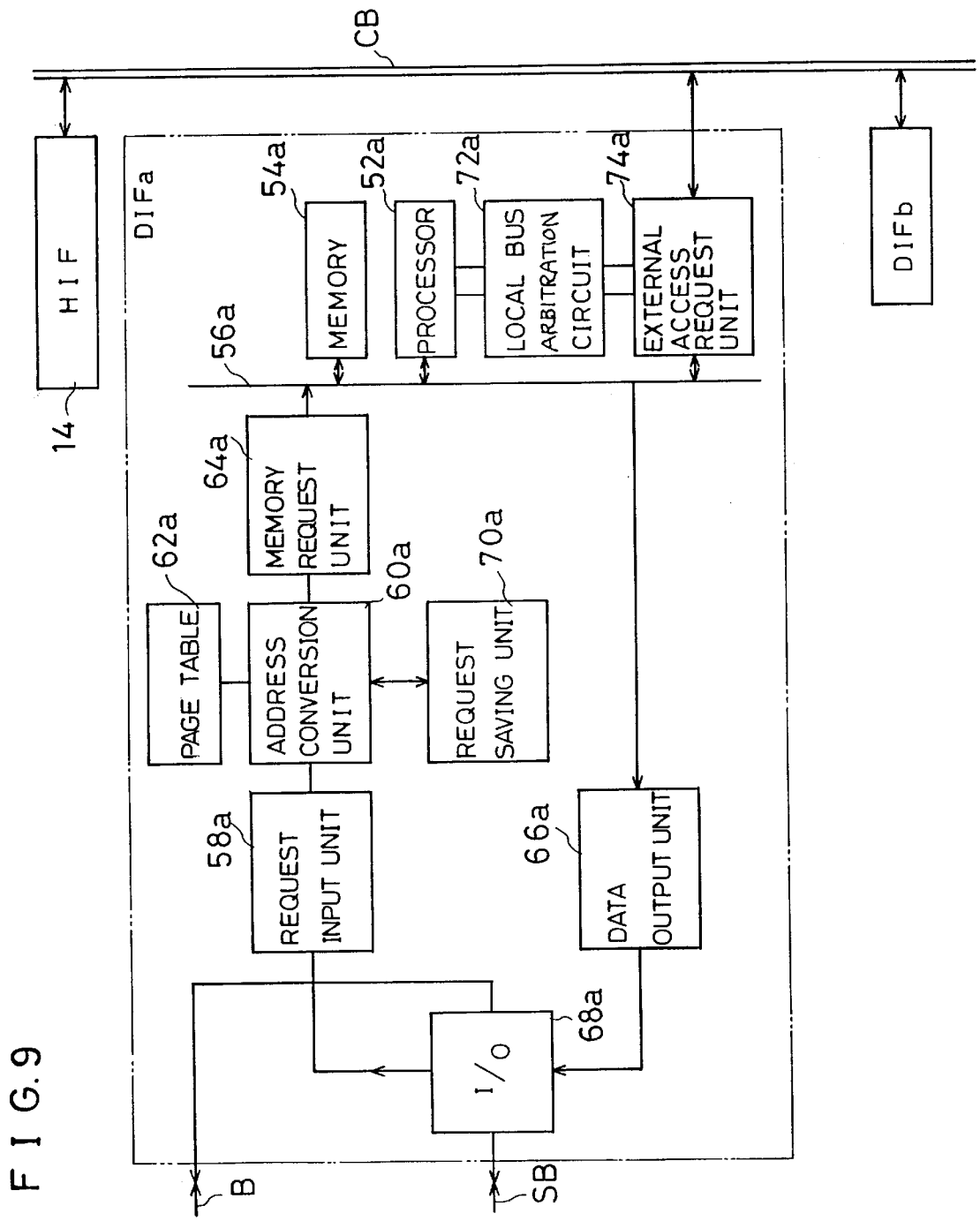
FIG. 9 is a block diagram showing one example of a disc interface included in the FIG. 3 embodiment.

In FIG. 9, the disc interface DIF of FIG. 3 and portions associated therewith are illustrated in greater detail. As shown in FIG. 9, the disc interface DIF includes a processor 52a and a memory 54a coupled to each other via a bus 56a. The processor 52a processes the access request from the processors PE00-PEmn (FIG. 3) which is given from the host interface 14 and through the common bus CB. That is, the access request from the processors PE00-PEmn is inputted to a request input unit 58a via a bus B and an I/O circuit 68a. The access request is transferred to an address conversion unit 60a in which a process for converting a virtual address of the access request into a physical or real address by referring to a page table 62a and etc. are performed. More specifically, when the requested data exists in the memory 54a (no page fault occurs), the access request is converted into an address for the memory 54a, and the converted access request is transferred to a memory request unit 64a, so that the access request is inputted to the memory 54a via the bus 56a, and the data at a predetermined address in the memory 54a is read or the data is written in a predetermined address of the memory 54a. Then the data in a case of the reading, or the data indicating that the writing is completed in a case of the writing, is outputted to the bus B via a data output unit 66a and the I/O circuit 68a.

On the other hand, if it is determined that the requested data does not exist in the memory 54a (page fault occurs) in the address conversion unit 60a, the access request is temporarily saved in a request saving unit 70a, and a data read request is outputted from the data output unit 66a to the secondary storage SS (FIG. 3) through the I/O circuit 68a and the bus SB. During a time that the data is read, a succeeding access request is processed by the address conversion unit 60a, and if an address included in the access request is of the memory 54a, the data in the address is read or the data is written in the address. When the data reading from the memory 54a is completed, the access request which has been saved in the request saving unit 70a is inputted again to the address conversion unit 60a, and the access request is converted into an address,of the memory 54a by referring to the page table 62a. Accordingly, the data is read or written for the access request, and the predetermined data is outputted through the data output unit 66a, the I/O circuit 68a and the bus B.

Thus, if the page fault occurs in the proceeding access request, during a time that predetermined data is read from the secondary storage SS, the access request is saved in the request saving unit 70a. Then, the succeeding access request is processed first. The data reading from the secondary storage SS is completed, the access request being saved in the request saving unit 70a is processed. Such an operation is achieved in accordance with a flowchart as shown in FIG. 10.

Thus, since the succeeding access request is processed without waiting for the processing of the access request in which the page fault occurs, it is possible to efficiently process the access request.

Furthermore, in such a kind of parallel computer, when a given processor intends to access a local memory of another processor, the processor acquires a right of use of the common bus by using its own local bus, and next, acquires a right of use of a local bus of another processor, and then, the processor can access to the local memory of another processor. In such a case, at the same time that the given processor requests the acquisition of the local bus of another processor via the common bus, if the target processor also requests the acquisition of the common bus, a deadlock occurs, and therefore, the system is stopped. Therefore, in the following embodiment, a scheme for continuing the processing without stopping of the system even if the acquisition requests of the bus conflicts with each other is made.

In the following, an embodiment in which the above described scheme is applied to the disc interface DIF;

however, it is pointed-out in advance that the following embodiment can be applied to the respective processors PE as it is in view of a fact that the disc interface DIF can be constructed as similar to the respective processors PE. In such a case, the respective functional components shown in FIG. 9 can be implemented by the entirety of the processor PE including the vector operation control unit 38 (FIG. 4).

More specifically, as shown in FIG. 9, the disc interface DIF further includes a local bus arbitration circuit 72a coupled to the processor 52a which applies a bus request signal for using the local bus 56a to a local bus arbitration circuit 72a which includes a bus arbitrator, for example. The local bus arbitration circuit, 72a returns a permission signal to the processor 52a at a timing that the local bus 56a becomes usable. The external access request unit 74a is coupled to the processor 52a and the memory 54a via the local bus 56a. The external access request unit 74a applies a bus request signal for using the local bus 56a to the local bus arbitration circuit 72a. Then, the local bus arbitration circuit 72a returns a permission signal to the external access request unit 74a at a timing that the local bus 56a becomes usable.

It is determined whether or not the local bus 56a is usable by determining whether or not the permission signal has been outputted from the local bus arbitration circuit 72a at that time. If the bus request signal is applied from the processor 52a to the local bus arbitration circuit 72a in a state where the permission signal is applied from the local bus arbitration circuit 72a to the external access request unit 74a, the processor 52a can not use the local bus 54a, and the converse is also true. If the bus request signal is applied to the local bus arbitration circuit 72a when no permission signal is outputted from the local bus arbitration circuit 72a, the permission signal is returned to the processor 52a or the external access request unit 74a which becomes to use the local bus 56a.

Figure 11:
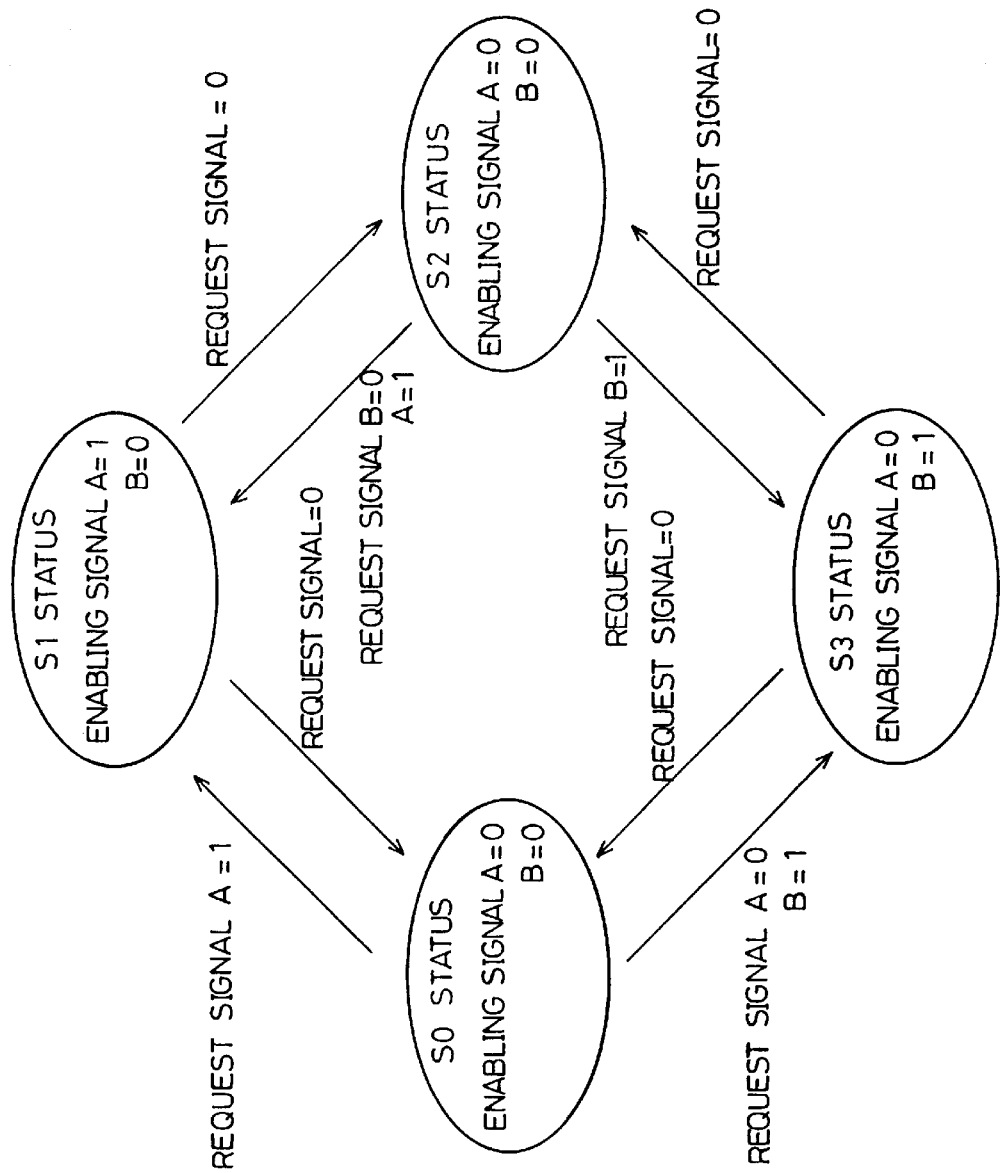
FIG. 11 is an illustrative view showing a status transition in a bus arbitration operation in the FIG. 9 embodiment.

In FIG. 11, a local bus arbitration operation implemented in the local bus arbitration circuit 72a is shown as a status transition diagram; however, a common bus arbitration operation (described later) achieved by the host interface 14 (FIG. 3) is similar to the local bus arbitration operation shown in FIG. 11.

Referring to FIG. 11, the local bus arbitration operation in the local bus arbitration circuit 72a is described.

First, if the permission signal is applied from the local bus arbitration circuit 72a to the external access request unit 74a when the bus request signal from the processor 52a is applied to the local bus arbitration circuit 72a, the local bus 56a is used by a processor other than the processor 52a. Therefore, the completion of the use of the local bus 56a is awaited, and the use of the local bus 56a is completed and the local bus 56a becomes to be used by the processor 52a, and the permission signal is applied to only the processor 52a.

If the permission signal is applied to the processor 52a from the local bus arbitration circuit 72a when the bus request signal from the external access request unit 74a is applied to the local bus arbitration circuit 72a, the local bus 56a is used by the processor 52a. Therefore, the completion of the use of the local bus 56a by the processor 52a is awaited, and the use of the local bus 56a is completed and the local bus 56a becomes to be used by the external access request unit 74a, and the permission signal is applied to only the external access request unit 74a.

Furthermore, if the bus request signals from the processor 52a and the external access request unit 74a are respectively applied to the local bus arbitration circuit 72a, in order to suitably give a priority to one of the processor 52a and the external access request unit 74a, the permission signal is applied to any one or both of these circuits.

In addition, the external access request unit 74a can apply an error signal to the processor 52a.

Furthermore, the external access request unit 74a is coupled to the common bus CB which is coupled to the host interface 14, and the external access request unit 74a applies a bus request signal to a common bus arbitration circuit (not shown) included in the host interface 14 which includes a bus arbitrator, for example, and a permission signal is returned to the external access request unit 74a from the host interface 14.

As shown in FIG. 12, the external access request unit 74a includes decoders 76a and 76b, AND gate 78, and gates 80a and 80b. In addition, in order to avoid complexity of the drawing, portions associated with the data is not shown in the external access request unit 74a. The decoder 76a monitors for an address at a side of the local bus 56a, and when the decoder 76a finds an address for the common bus CB, the same applies the bus request signal to the host interface 14. When the permission signal is returned from the host interface 14 to the external access request unit 74a, the permission signal is applied to an enable terminal OE of the gate 80a, and therefore, the gate 80a is opened, and accordingly, a signal from the local bus 56a is outputted to the common bus CB.

Likewise, the decoder 76b monitors for an address at a side of the common bus CB, and when the decoder 76b detects an address for the local bus 56a, the same applies to a bus request signal to the local bus arbitration circuit 72a. At that time, if the bus request signal from the decoder 76a and the bus request signal from the decoder 76b are issued at the same time, the error signal is applied to the processor 52a from the AND gate Then, when the permission signal is returned to the external access request unit 74a from the local bus arbitration circuit 72a, the permission signal is applied to an enable terminal OE of the gate 80b, and the gate 80b is opened, and accordingly, a signal from the common bus CB is outputted to the local bus 56a.

Then, adjacent disc interface DIFa and DIFb are connected to the common bus CB and the common bus arbitration circuit, i.e. the host interface 14. In the following description, "a" is affixed to one disc interface and associated components, and "b" is affixed to the other disc interface and the associated components. However, components for the disc interface DIFb is not shown in FIG. 9.

Figure 13A:
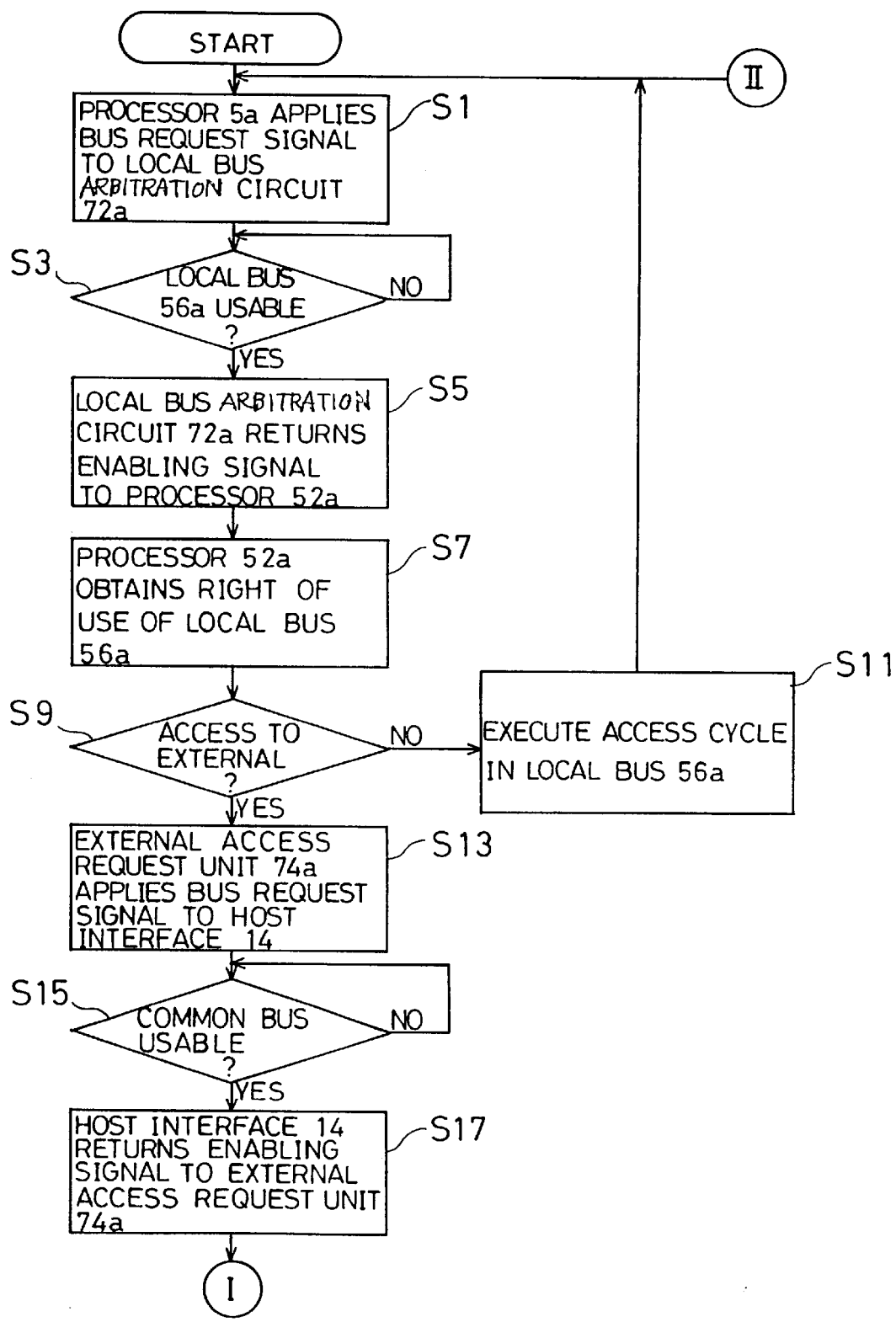

With reference to FIGS. 13A and 13B, as one example, an operation that a processor 52a of one disc interface DIFa accesses a local memory 54b of the other disc interface DIFb. However, it is to be noted in advance that the converse is also true.

In a step S1, the bus request signal is applied from the processor 52a to the local bus arbitration circuit 72a to use the local bus 56a. In a step S3, it is determined whether or not the local bus 56a is usable, and it is waited that the local bus 56a becomes usable At a time that the local bus 56a becomes usable, in a step S5, the permission signal from the local bus arbitration circuit 72a is returned to the processor 52a. Then, in a step S7, the processor 52a acquires the right of use of the local bus 56a, and outputs an address, control signals and etc. to the local bus 56a. In a step S9, it is determined by the external access request unit 74a whether or not a memory that the processor 52a intends to access exists outside, that is, it is determined whether or not the access request is an access from the common bus CB to the outside. It can be determined on the basis of the address from the local bus 56a. If it is not an access to the outside, in a step S11, an access cycle is executed in the local bus 56a, and then, the process returns to the step S1.

On the other hand, if it is determined that the access request is the access to the outside in the step S9, in a step S13, the external access request unit 74a applies the bus request signal to the common bus arbitration circuit, i.e. the host interface 14. Then, in a step S15, it is determined whether or not the common bus CB is usable, and it is waited that the common bus CB becomes usable. At a time that the common bus CB becomes usable in the step S15, in a step S17 the host interface 14 returns the permission signal to the external access request unit 74a. Respondingly, in a step S19 shown in FIG. 13B, the external access request unit 74a acquires the right of use of the common bus CB, and outputs an address, control signals and etc. to the common bus CB.

Thereafter, in a step S21, it is determined whether or not the request from the common bus CB is an access to the local bus 56b by the external access request unit 74b which watches the address on the common bus CB, and if the request is not an access to the local bus 56b, the process proceeds to a step S23. In the step S23, another local bus is accessed, and the process returns to the step S1.

Furthermore, if it is determined that the request is an access to the local bus 56b in the step S21, the process proceeds to a step S25 in which it is determined whether or not an access request from the local bus 56b to the outside exists at the same time. If it is determined that there is the access request from the local bus 56b to the outside, that is, if the access from the processor 52b has acquired the local bus 56b and the access request to the external memory from the 52b occurs, the process proceeds to a step S27. In the step S27, the external access request unit 74b applies the error signal to the processor 52b to request a forced completion of the access cycle, and applies the bus request signal to the local bus arbitration circuit 72b. Then, in a step S29, the processor 52b terminates the bus cycle which is presently executed, and the processor 52b releases the local bus 56b, and the process proceeds to a step S33.

On the other hand, it is determined that no external access request from the local bus 56b is issued in the step S25, in a step S31, the external access request unit 74b applies the bus request signal to the local bus arbitration circuit 72b, and the process proceeds to the step S33. In the step S33, it is determined whether or not the local bus 56b is usable, and it is waited that the local bus 56b becomes usable. At a timing that it is determined that the local bus 56b is usable in the step S33, the process proceeds to a step S35 in which the local bus arbitration circuit 72b returns the permission signal to the external access request unit 74b. Then, in a step S37, the external access request unit 74b acquires the right of use of the local bus 56b, and outputs addresses, control signals and etc. to the local bus 56b. Resultingly, in a step S39, the processor 52a acquires the right of use of each of the local bus 56a, the common bus CB and the local bus 56b, and therefore, the processor 52a can access the memory 54b. When the access is completed, the process returns to the step S1.

In addition, the processor 52b which receives the error signal from the external access request unit 74b and releases the local bus 56b confirms the course of generation of the error signal that "an error due to bus conflict" by an interrupt or the like, and the processor 52b starts the program execution again from the same address.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parallel computer, comprising:

a plurality of processors connected in a network;

a plurality of secondary storage units each capable of being accessed by said plurality of processors, a portion of a file to be saved in a selected one of said plurality of secondary storage units in accordance with an interleave scheme;

interleave size management means for managing an interleave size of the interleave scheme in regard to the file portion which is to be saved in the selected secondary storage unit, said interleave size management means including
  a management table in which interleave size data is stored in correspondence to file name data, and
  interleave size selection means for selecting an interleave size from said management table in response to a file access request input including a file name; and
  file access means for accessing said plurality of secondary storage units according to an interleave size selected by said interleave size selection means.

2. A parallel computer according to claim 1, wherein said interleave size management means includes means for saving a portion of said file being saved into each of said plurality of secondary storage units in accordance with a different interleave size as set by said interleave size selection means.

3. A parallel computer, comprising:

a plurality of processors connected in a network;

at least one main storage unit capable of being accessed by said plurality of processors;

a plurality of secondary storage units each capable of being accessed by said plurality of processors, a portion of a data file of said main storage unit to be saved in a selected one of said plurality of secondary storage units in accordance with an interleave scheme;

interleave size management means for managing an interleave size of the interleave scheme in regard to the portion of the data file which is to be saved in the selected secondary storage unit, said interleave size management means including a management table in which interleave size data is stored in correspondence to file name data, and an interleave size selection means for selecting an interleave size from said management table in response to a file access request input including a file name; and data access means for accessing said plurality of secondary storage units according to an interleave size selected by said interleave size selection means.

4. A parallel computer, comprising:

a plurality of first processors connected in a network;

a plurality of secondary storage units coupled to said network, a portion of a data file to be saved in a selected one of said plurality of secondary storage units in accordance with an interleave scheme;

a plurality of secondary storage interfaces connected between said plurality of secondary storage units and said network, respectively, for controlling associated secondary storage units;

first interleave size management means for managing an interleave size of the interleave scheme in regard to the data file portion which is saved in the selected secondary storage unit, said interleave size management means including a management table in which interleave size data is stored in correspondence to file name data, and an interleave size selection means for selecting an interleave size from said management table in response to a file access request input including a file name; and first file access means provided in each of said plurality of first processors for accessing said secondary storage units according to an interleave size selected by said interleave size selection means.

5. A parallel computer according to claim 4, further comprising a respective first local memory associated with each of said plurality of first processors, a portion of data of at least one of said first local memories being saved in said plurality of secondary storage units in accordance with [an] said interleave scheme;

second interleave size management means for managing an interleave size of the data portion which is saved in said plurality of secondary storage units; and second data access means for accessing said plurality of secondary storage units by selecting an interleave size of an interleave system.

6. A parallel computer according to claim 5, further comprising a host computer coupled to said network; and a host interface connected between said network and said host computer, wherein said host interface includes said second interleave size management means.

7. A parallel computer according to claim 4, further comprising a common bus for coupling said plurality of secondary storage interfaces, wherein each of said plurality of secondary storage units includes a second processor having a respective second local memory and a corresponding second local bus, the second local memories of said second processors being coupled to each other by said second local buses.

8. A parallel computer according to claim 7, wherein each of said plurality of secondary storage interfaces includes:

external access request means for coupling said second local bus to a common bus, and first bus arbitration means coupled to said second processors and said external access request means to respond to a conflict between a first acquisition request applied from said common bus to the said second local bus of a second processor through said external access request means and a second acquisition request applied from said second local bus of the second processor to said common bus through said external access request means to give priority to said first acquisition request.

9. A parallel computer according to claim 8, further comprising second bus arbitration means coupled to said common bus to respond to a third acquisition request applied from said second local bus of the second processor to said common bus through said access request means to apply a permission signal to said external access request means when said common bus is usable.

10. A parallel computer according to claim 7, wherein each of said plurality of second processors includes request saving means for saving in said request savings means an access request from said first processor for data that does not exist in said second local memory of a said second processor in order to be able to process another access request.

11. A parallel computer, comprising:

a plurality of processors connected in a network;

a plurality of secondary storage units each capable of being accessed by said plurality of processors, a portion of a file to be saved in an arbitrary one of said plurality of secondary storage units in accordance with an interleave scheme;

interleave information management means provided in each of said plurality of processors for managing interleave information of the interleave scheme in regard to the file portion which is to be saved in the arbitrary one of said secondary storage units, said interleave information management means operating according to a file name written in advance and including a management table having interleave information including interleaved position, and an interleave system selection means for selecting an interleave system with reference to said management table in response to a file name; and access request output means provided in each of said plurality of processors for outputting an access request in accordance with an interleave system selected by said interleave system selection means.

* * * * *